United States Patent [19]
Knoth

[11] 3,851,913
[45] Dec. 3, 1974

[54] TRACTOR CAB WITH COMBINED TILT PIVOT AND RESILIENT MOUNTS

[75] Inventor: Harold Monroe Knoth, Davenport, Iowa

[73] Assignee: Deere & Company, Moline, Ill.

[22] Filed: Oct. 1, 1973

[21] Appl. No.: 395,499

[52] U.S. Cl............................................. 296/35 R
[51] Int. Cl............................................. B62d 23/00
[58] Field of Search........ 296/28 C, 35 R; 267/63 R

[56] References Cited
UNITED STATES PATENTS

| | | | |
|---|---|---|---|
| 3,380,773 | 4/1968 | Sewelin............................ | 296/28 C |
| 3,656,799 | 4/1972 | Malm et al........................... | 296/35 |
| 3,752,530 | 8/1973 | Voth................................. | 296/35 R |

Primary Examiner—Stanley H. Tollberg
Assistant Examiner—John P. Shannon

[57] ABSTRACT

A tractor cab is supported on spaced apart mounting means, each of which is resilient to carry the cab in vibration-isolated relation to the tractor during normal operation, one of which combines or includes a pivot and the other of which includes separable parts so that the cab may be tilted about the pivot, as for servicing, etc. The resilient pivot means is also separable to enable complete removal of the cab from the tractor.

2 Claims, 9 Drawing Figures

PATENTED DEC 3 1974

TRACTOR CAB WITH COMBINED TILT PIVOT AND RESILIENT MOUNTS

BACKGROUND OF THE INVENTION

The recent trend toward the use of cabs on agricultural and other tractors has posed a number of problems, foremost of which is the necessity for at least partially removing the cab for servicing of the underlying components, e.g. the transmission. At the same time, it is desirable that the cab be completely removed, as for replacement. The reverse problems occur in installing the cab in the first place or after it has been removed. These problems have been accentuated by innovations in resilient mounts so that the cab, or its equivalent, is carried by and in vibration-isolated relation to the tractor, so as to add to the comfort and convenience of the operator with respect to noise, etc.

It is known, of course, especially in motor trucks, as well as in tractors, to mount the cab for selective tilting between normal and tilted positions. See, for example, U.S. Pat. No. 3,582,132, issued June 1, 1971 to Gunning. It is likewise known, in automobiles, as a matter of general knowledge, to rubber-mount the body on the chassis, and this principle has been carried forward into tractors, as in U.S. Pat. No. 3,438,672, issued Apr. 15, 1969 to Gipp, except that the Gipp structure cannot be tilted. Several of the problems noted, and those to be discussed, offer self-contradicting solutions. For example, Gipp recognizes that it is virtually useless to rubber-mount the cab unless the control console (carrying the steering wheel and other controls) is also rubber-mounted, because a console rigidly mounted on the tractor is inconsistent with a vibration-isolated operator in the vibration-isolated cab; therefore, Gipp mounts the console on the cab floor, which means that, when the cab is to be removed, the console must also be removed or remain with the cab. As a result, all the connections between the console and the controllable tractor parts connected therewith must be disconnected, and this is quite complicated especially when hydraulic lines (as for power steering) must be separated.

This problem is solved to a considerable extent by U.S. Pat. No. 3,656,799, issued Apr. 18, 1972 to Malm et al, where the cab and console, operative as a unitized elastomer-mounted assembly during normal operation of the tractor, may be separated for removal of the cab while leaving the console sustained by the tractor, thus permitting console-to-tractor connections to remain intact. Another advantage of the Malm et al invention is that the tractor, with the cab removed and the console carried by the tractor, may be operated in at least a limited fashion by the intact controls, when the cab has been removed for servicing as well as during assembly before the cab is completely installed.

The Malm et al invention, while providing several essential and innovative advantages, e.g., vibration-isolated mounting of the cab and a separable console-to-cab connection so that the cab may be removed while leaving the console on the tractor, does not disclose in the patent means for enabling tilting of the cab. One approach, not industrially evaluated so far as is known, is shown in ASAE Paper No. 72-687, wherein Malm et al is essentially followed but "auxiliary" means is provided for tilting the cab. This additional means is disconnected during normal operation of the tractor and, when it is desired to tilt the cab, pivot pins must be inserted and, when the cab is replaced, the pins must be removed or they would cancel out the vibration-isolation effects of the adjacent rubber mounts.

SUMMARY OF THE INVENTION

According to the present invention, Malm et al is followed while the disadvantage of the ASAE Paper is avoided, because the provision for tilting the cab combines appropriate elastomer mounts with pivot means that need not be inserted and removed. The invention further features a combined pivot and mount that, when intact, enables tilting of the cab, and, when released, permits the cab to be entirely removed.

DESCRIPTION OF THE PREFERRED EMBODIMENT

Figure 1:
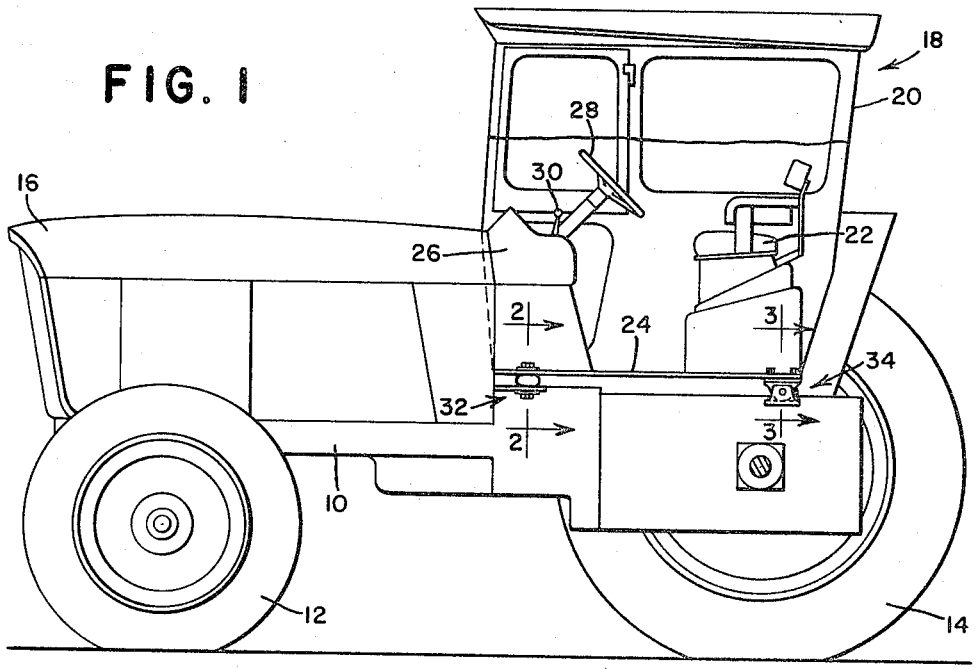
FIG. 1 is a side elevation, with portions broken away, of a typical tractor equipped with a resiliently-mounted tiltable cab.

The tractor shown here is typical, having a fore-and-aft main frame or body 10 carried by front wheels 12 and rear wheels 14 and having the usual engine enclosure 16 at the rear of which is disposed an operator's station 18 comprising a cab 20, operator's seat 22 and a floor or bottom structure 24. A control island or console 26 is interposed between the operator's seat and the rear of the engine enclosure or hood and, as is shown in the Malm et al patent, lies substantially within the cab, carrying various tractor controls, here represented by a steering wheel 28 and throttle lever 30.

The vibration-isolated mounting of the cab, its interior components and console is such that the operator's station 18 becomes a unitized assembly so far as concerns substantial freedom from tractor noise, vibration, etc. At this point, it should be noted that the console is isolated from the engine hood. When power steering is employed, the connection between the steering wheel and front steering mechanism relies on flexible hydraulic lines, and other controls carried by the console are suitably connected to the engine, etc., components by nonrigid elements. This is all conventional and need not be elaborated here.

Figure 5:
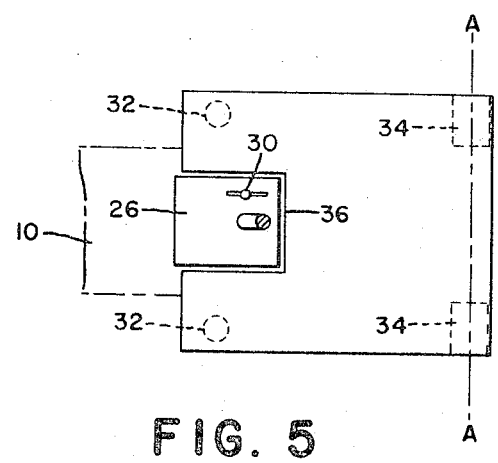
FIG. 5 is a schematic plan of the cab floor and control island or console.

In a simple mounting, four rubber or elastomer mounts may be used. Considering the cab floor 24 as essentially rectangular (FIG. 5), the four mounts will be substantially at the corners of the floor. In this case, there are two front mounts 32 and a pair of rear mounts 34. Here, as in the instance of referring to the cab floor as rectangular, the words "front" and "rear" are used descriptively and not in a limiting sense.

Figure 2:
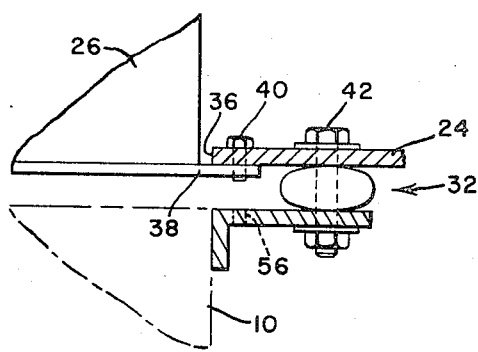
FIG. 2 is an enlarged section of a front mount as seen along the line 2—2 of FIG. 1.

The cab floor is so constructed at its fore part that an opening 36 exists in order to accommodate the upright console 26, and the bottom of the console has a peripheral flange 38 (FIG. 2) which underlies the cab floor or platform in the marginal area thereof in which the opening 36 is provided. In normal operative assembly of the operator's station 18 on the tractor, and to provide the unitized structure, the console flange is rigidly connected to the cab floor by any suitable means, such as a plurality of removable cap screws 40. This keeps the bottom of the console vertically clear of the tractor body or frame; i.e., the mounts 32 and 34 sustain the unitized assembly during normal operation, and the console becomes, in effect, part of the cab. An alternate but equivalent construction is shown by Malm et al, in which the console is carried by the front mounts and the cab floor is connected to the console. Both constructions achieve the same result insofar as concerns the ability of the console to remain sustained by the tractor when the cab is removed or tilted, as will be explained below.

Figure 3:
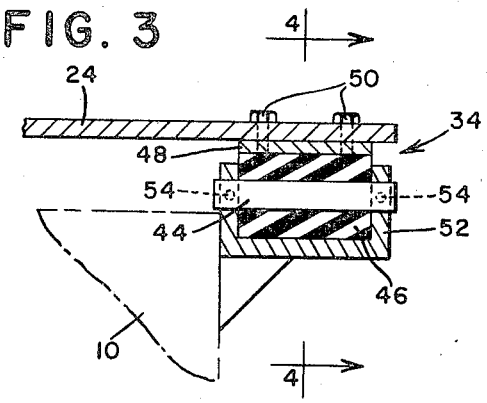
FIG. 3 is an enlarged section of one of the rear mounts as seen along the line 3—3 of FIG. 1.
Figure 4:
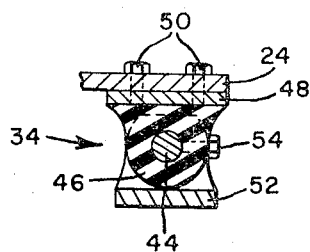
FIG. 4 is a section as seen along the line 4—4 of FIG. 3.

The front mounts 32 may be of any suitable type; e.g., as in Malm et al. The details are not material except to note that the mounts are separable, as by removing cap screws or bolts 42. The rear mounts (FIGS. 1-5) incorporate transverse coaxial pivot means or pins 44, preferably embedded in and bonded to elastomer blocks 46, each of which is in turn bonded or otherwise secured to a plate 48 detachably secured to the under portion of the cab floor 24 by cap screws 50 (FIGS. 3 and 4). Each pin 44 is carried at its opposite ends in a bracket 52 that is rigidly secured to the tractor in any suitable manner not important here. Each pin may be further secured in place by set screws 54, and these may be released when it is desired to tilt the cab, the accomplishment of which is effected by first removing the floor-to-console cap screws 40, then releasing the front mounts from their connection to the tractor and then tilting the cap upwardly and rearwardly about the axis of the rear pivot pins 44 (see A—A, FIG. 5).

Before the cap screws 42 are removed, it may be desirable to block up the console; i.e., to insert blocks in the space between the bottom of the console and the top of the tractor frame (FIG. 2), and it may even be desirable to utilize longer cap screws (to replace the cap screws 42 after the cab is tilted or removed) to secure the console to the tractor, as by threading such longer (or the same) cap screws into tapped bores as provided at 56 in the tractor-carried part of each front mount 32. If the blocks are not used, the console may be allowed to descend to the tractor frame and then secured or not as the user wishes. In any event, the console remains sustained by the tractor when the cab is tilted or removed. In the Malm et al patent, the console remains carried by the tractor because it is supported by the front mounts. In either case, as explained by Malm et al, this is a desirable feature for several reasons; e.g., the connections between the console and controllable parts need not be disconnected, the console will not be dislocated when the cab is tilted or removed and the tractor may be operated to at least a limited extent even with the cab absent or tilted.

When it is desired to remove the cab entirely, the rear mounts 34 may be separated as respects their cab-to-tractor connection, as by removal of the cap screws 50 (FIGS. 3 and 4).

Figure 6:
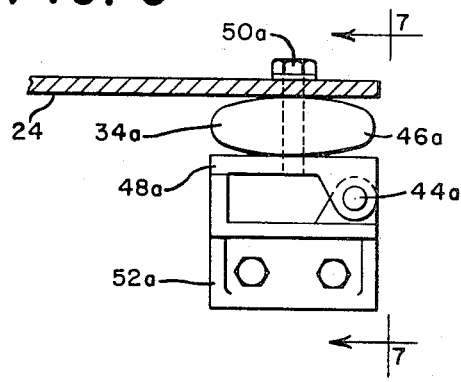
FIG. 6 is a section similar to FIG. 3 but showing a modified form of rear mount.
Figure 7:
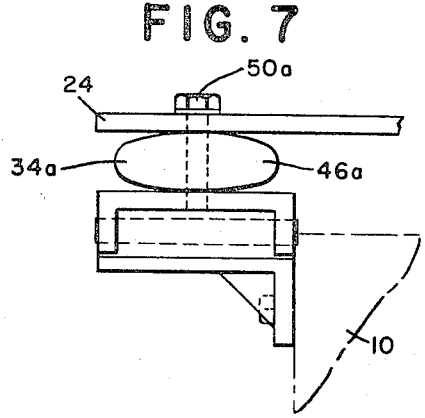
FIG. 7 is a view as seen along the line 6—6 of FIG. 7.

In the modification shown in FIGS. 6 and 7, each rear mount 34a is secured by a bolt 50a, through an elastomer block 46a, to a member 48a which is in turn connected by a pivot pin 44a to a bracket 52a rigidly secured to the tractor. Results equivalent to those described above will follow.

Figure 8:
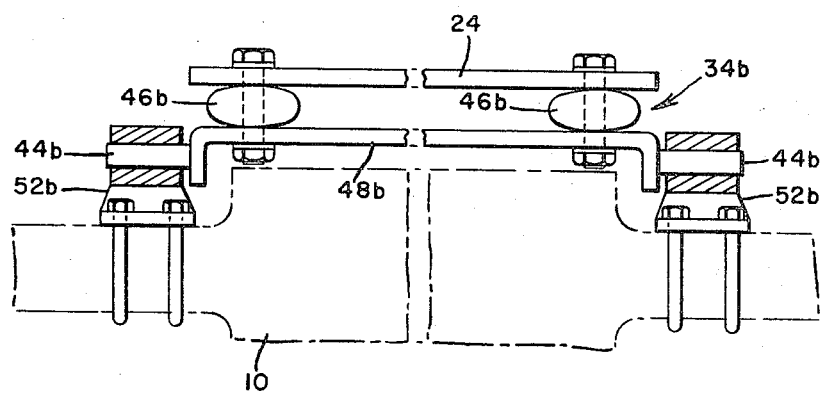
FIG. 8 is a transverse section showing a further modification of rear mount.

In the further modification in FIG. 8, the mounts 34b include elastomer blocks or "doughnuts" 46b secured to a transverse member 48b which has its opposite ends formed as pivots 44b carried in brackets 52b mounted on the tractor rear axle housings. This construction also affords pivotal mounting of the cab for tilting as well as separation of the mounts for complete removal of the cab.

Figure 9:
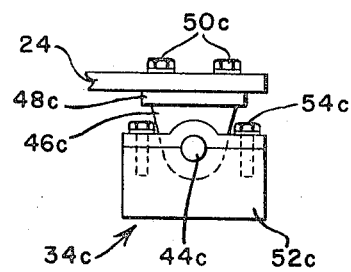
FIG. 9 is a fragmentary end view of a still further form of rear mount.

The third modification (FIG. 9) utilizes in each rear mount a mount 34c including a metal member 48c secured by cap screws 50c to the cab floor 24 and secured also to a rubber block 46c which is carried by a pivot pin 46c in a tractor-mounted bracket 52c. In addition, the bracket 52c is of a split construction enabling separation by removal of cap screws 54c. Once again, the foregoing features are available.

It will be clear, of course, that parts of the modifications may be interchanged with each other so that the best mode of construction and operation will be achieved.

I claim:

1. A tractor and operator's station therefor including a cab, means pivotally mounting the cab on the tractor for swinging between normal and tilted positions, an operator's console at least partially within the cab and detachably connected to the cab to combine therewith to form a unitized console-cab assembly during normal operation of the tractor and to be detached from the cab to remain with the tractor when the cab is tilted, and separable resilient mounting means spaced from the pivot means and connecting the assembly to the tractor in vibration-isolated relation to the tractor, characterized in that the pivot means comprises a support on the tractor, an intermediate part pivoted to the support, and an elastomer element connected to the intermediate part and to the cab to complete the vibration-isolated mounting of the assembly during normal tractor operation yet allowing tilting of the cab relative to the tractor and console when the mounting means is separated.

2. A tractor and operator's station therefor including a cab, means pivotally mounting the cab on the tractor for swinging between normal and tilted positions, an operator's console at least partially within the cab and detachably connected to the cab to combine therewith to form a unitized console-cab assembly during normal operation of the tractor and to be detached from the cab to remain with the tractor when the cab is tilted, and separable resilient mounting means spaced from the pivot means and connecting the assembly to the tractor in vibration-isolated relation to the tractor, characterized in that the pivot means includes supports on the tractor spaced apart along the axis of the pivot means, a member extending along the axis and having opposite end portions pivotally mounted in the support, and elastomer means interposed between the member and the cab to complete the vibration-isolated mounting of the assembly during normal tractor operation yet allowing tilting of the cab relative to the tractor and console when the mounting means is separated.

* * * * *